(12) United States Patent
Takahashi et al.

(10) Patent No.: US 7,749,085 B2
(45) Date of Patent: Jul. 6, 2010

(54) NETWORK GAME SYSTEM

(75) Inventors: Kazuya Takahashi, Tokyo (JP);
Masahiko Kami, Hyogo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 128 days.

(21) Appl. No.: 11/477,397

(22) Filed: Jun. 30, 2006

(65) Prior Publication Data
US 2006/0247063 A1 Nov. 2, 2006

Related U.S. Application Data

(62) Division of application No. 10/386,945, filed on Mar. 13, 2003, now Pat. No. 7,452,277.

(30) Foreign Application Priority Data

Mar. 13, 2002 (JP) .......................... P2002-069039

(51) Int. Cl.
*A63F 13/00* (2006.01)
*A63F 13/12* (2006.01)

(52) U.S. Cl. .............................. 463/42; 463/29; 463/40; 273/138.1; 705/56; 705/64; 705/67; 709/203; 902/23

(58) Field of Classification Search ............ 463/16–23, 463/25–27, 29, 30–33, 40–43, 47, 28, 39; 273/138.1, 139, 138.2, 141 A, 454–456, 460; 709/203–207; 713/1, 100, 150, 182, 187–189, 713/300, 375, 400, 500, 600; 705/56–57, 705/64, 67, 72, 74–75, 78–79; 902/2–3, 902/23, 38, 40; *A63F 13/00, 13/12*

See application file for complete search history.

(56) References Cited

U.S. PATENT DOCUMENTS 4,636,951 A * 1/1987 Harlick ........................ 463/25
5,038,022 A * 8/1991 Lucero ........................ 463/25

(Continued)

FOREIGN PATENT DOCUMENTS

JP 10-063364 A 3/1998

(Continued)

OTHER PUBLICATIONS

Wang, et al.; Casino Technology: Player Tracking and Slot Accounting Systems; UNLV Gaming Research & Review Journal; 2000; pp. 43-56; vol. 6, Issue 1; New York.

(Continued)

*Primary Examiner*—Peter DungBa Vo
*Assistant Examiner*—Arthur O. Hall
(74) *Attorney, Agent, or Firm*—Sughrue Mion, PLLC

(57) ABSTRACT

A game machine operable to execute a game program is communicatively connected to a center server. In the center server, a first transmitter transmits, to the game machine, first data indicating a settled play amount out of a played amount which is represented by either an accumulated number or time period that the game program has been executed. In the game machine, a first storage is operable to store the first data, a second storage is operable to store second data indicating the played amount, and a third storage is operable to store third data indicating an allowable unsettled play amount which represents either an allowable number or time period of which the game program is executed without settlement. In the game machine, a first receiver receives the first data transmitted by the first transmitter, an updater updates the first data stored in the first storage with the first data received by the first receiver, and a controller controls the game machine based on the first data stored in the first storage, the second data stored in the second storage and the third data stored in the third storage.

5 Claims, 10 Drawing Sheets

U.S. PATENT DOCUMENTS

| | | | |
|---|---|---|---|
| 5,243,652 A * | 9/1993 | Teare et al. | 380/250 |
| 5,324,035 A | 6/1994 | Morris | |
| 5,418,713 A * | 5/1995 | Allen | 705/32 |
| 5,429,361 A * | 7/1995 | Raven et al. | 463/25 |
| 5,457,306 A | 10/1995 | Lucero | |
| 5,580,309 A * | 12/1996 | Piechowiak et al. | 463/16 |
| 5,752,882 A | 5/1998 | Acres | |
| 5,833,540 A * | 11/1998 | Miodunski et al. | 463/42 |
| 5,882,262 A * | 3/1999 | Ballhorn | 463/43 |
| 5,919,091 A * | 7/1999 | Bell et al. | 463/25 |
| 5,938,741 A * | 8/1999 | Itoh et al. | 710/6 |
| 5,954,583 A * | 9/1999 | Green | 463/29 |
| 5,970,143 A | 10/1999 | Schneier et al. | |
| 5,984,787 A | 11/1999 | Redpath | |
| 6,012,983 A * | 1/2000 | Walker et al. | 463/20 |
| 6,077,163 A * | 6/2000 | Walker et al. | 463/26 |
| 6,099,408 A * | 8/2000 | Schneier et al. | 463/29 |
| 6,119,153 A * | 9/2000 | Dujari et al. | 709/218 |
| 6,165,072 A | 12/2000 | Davis et al. | |
| 6,264,561 B1 * | 7/2001 | Saffari et al. | 463/42 |
| 6,272,523 B1 | 8/2001 | Factor | |
| 6,293,866 B1 * | 9/2001 | Walker et al. | 463/20 |
| 6,302,793 B1 | 10/2001 | Fertitta, III et al. | |
| 6,319,127 B1 | 11/2001 | Walker | |
| 6,364,768 B1 * | 4/2002 | Acres et al. | 463/25 |
| 6,607,441 B1 * | 8/2003 | Acres | 463/25 |
| 6,623,360 B1 * | 9/2003 | Nakajima | 463/40 |
| 6,628,939 B2 | 9/2003 | Paulsen | 455/414.1 |
| 6,645,077 B2 * | 11/2003 | Rowe | 463/42 |
| 6,676,522 B2 * | 1/2004 | Rowe et al. | 463/42 |
| 6,692,360 B2 * | 2/2004 | Kusuda et al. | 463/42 |
| 6,739,975 B2 * | 5/2004 | Nguyen et al. | 463/39 |
| 6,761,636 B2 * | 7/2004 | Chung et al. | 463/42 |
| 6,896,618 B2 * | 5/2005 | Benoy et al. | 463/25 |
| 6,908,390 B2 | 6/2005 | Nguyen | |
| 6,969,320 B2 | 11/2005 | Lind | |
| 7,127,069 B2 * | 10/2006 | Nguyen | 380/278 |
| 7,168,089 B2 * | 1/2007 | Nguyen et al. | 726/4 |
| 7,329,187 B1 * | 2/2008 | Holch et al. | 463/42 |
| 7,470,196 B1 * | 12/2008 | Joshi | 463/42 |
| 2001/0029205 A1 * | 10/2001 | Taho et al. | 463/43 |
| 2002/0049087 A1 * | 4/2002 | Ushiro et al. | 463/42 |
| 2002/0187834 A1 | 12/2002 | Rowe | |
| 2003/0073497 A1 | 4/2003 | Nelson | |
| 2004/0072617 A1 | 4/2004 | Takahashi | |
| 2005/0085294 A1 | 4/2005 | Walker | |

FOREIGN PATENT DOCUMENTS

| | | |
|---|---|---|
| JP | 2000-157724 | 6/2000 |
| JP | 2001-67529 A | 3/2001 |
| JP | 2001-198363 A | 7/2001 |
| JP | 2001-314641 A | 11/2001 |
| KR | 1998-39171 A | 8/1998 |
| KR | 2000-0037417 A | 7/2000 |
| KR | 2001-0050371 A | 6/2001 |
| KR | 2002-8731 A | 1/2002 |
| WO | WO 01/05477 A2 | 1/2001 |
| WO | WO 01/32281 A1 | 5/2001 |
| WO | WO 02/32517 A2 | 4/2002 |

OTHER PUBLICATIONS

Peterson; A Yellow-Pages Service for a Local-Area Network; Dept. of Computer Science, Univ. of Arizona; 1988; pp. 235-242; Tucson, AZ.

Universal Description, Discovery and Integration (UDDI.org); UDDI Technical White Paper; Sep. 6, 2000; pp. 1-13.

USPTO Office Action dated Jul. 25, 2006.

* cited by examiner

FIG. 3

| ARCADE ID | NETWORK ADDRESS |
|---|---|
| 0001 | NETWORK ADDRESS 1 |
| 0002 | NETWORK ADDRESS 2 |
| 0003 | NETWORK ADDRESS 3 |

| ARCADE ID | GAME MACHINE ID |
|---|---|
| 0001 | P001 |
| 0001 | P002 |
| 0001 | P003 |

| ARCADE ID | REMAINED PLAY AMOUNT |
|---|---|
| 0001 | 1000 |
| 0002 | 500 |
| 0003 | 1500 |

| GAME MACHINE ID | PLAYED AMOUNT | SETTLED PLAY AMOUNT |
|---|---|---|
| 0001 | 1000 | 800 |
| 0002 | 1500 | 1500 |
| 0003 | 2000 | 2000 |

| SERVICE | ACCESS DESTINATION |
|---|---|
| SERVICE 1 | http://center/cgi-bin/service1.cgi |
| SERVICE 2 | http://center/cgi-bin/service2.cgi |
| SERVICE 3 | http://center/cgi-bin/service3.cgi |

| PLAYED AMOUNT | SETTLED PLAY AMOUNT | ALLOWABLE UNSETTLED PLAY AMOUNT |
|---|---|---|
| 1000 | 1000 | 100 |

FIG. 10

| SERVICE | ACCESS DESTINATION |
|---|---|
| SERVICE 1 | http://center/cgi-bin/service1.cgi |
| SERVICE 2 | http://center/cgi-bin/service2.cgi |
| SERVICE 3 | http://center/cgi-bin/service3.cgi |

FIG. 13A

| GAME MACHINE | | | CENTER SERVER | |
|---|---|---|---|---|
| PLAYED AMOUNT | SETTLED PLAY AMOUNT | ALLOWABLE UNSETTLED PLAY AMOUNT | PLAYED AMOUNT | SETTLED PLAY AMOUNT | REMAINED PLAY AMOUNT |
| 100 | 100 | 10 | 100 | 100 | 15 |

FIG. 13B

| GAME MACHINE | | | CENTER SERVER | |
|---|---|---|---|---|
| PLAYED AMOUNT | SETTLED PLAY AMOUNT | ALLOWABLE UNSETTLED PLAY AMOUNT | PLAYED AMOUNT | SETTLED PLAY AMOUNT | REMAINED PLAY AMOUNT |
| 101 | 101 | 10 | 101 | 101 | 14 |

FIG. 13C

| GAME MACHINE | | | CENTER SERVER | |
|---|---|---|---|---|
| PLAYED AMOUNT | SETTLED PLAY AMOUNT | ALLOWABLE UNSETTLED PLAY AMOUNT | PLAYED AMOUNT | SETTLED PLAY AMOUNT | REMAINED PLAY AMOUNT |
| 102 | 101 | 10 | 101 | 101 | 14 |

NETWORK GAME SYSTEM

BACKGROUND OF THE INVENTION

This is a divisional application of U.S. patent application Ser. No. 10/386,945 filed Mar. 13, 2003 now U.S. Pat. No. 7,452,277. The entire disclosure of U.S. patent application Ser. No. 10/386,945 is hereby incorporated by reference.

The invention relates to a network game system, to a center server and a game machine to be used with the system, and to a method and program for controlling the center server and the game machine.

A network game system utilizing a communications network has already been proposed. An example of such a game system is a game machine, such as that described in Japanese Patent Publication No. 10-63364A, wherein a predetermined server collectively manages the game playing rights to cause the game machine to execute a game program only to a specified extent (or a specified number of times or for only a specified time period), and wherein a bill corresponding to the extent to which the game program is executed (i.e., the extent to which the player has played the game) is charged. Another known game system offers a so-called network (or on-line) game, wherein a game machine executes a game program in accordance with data or a program received from a predetermined server. The game machine executes a game program while accessing a predetermined server (concretely, service offered by the server), as required.

When a predetermined server in such a game system collectively manages the game playing rights, the game machine accesses the server, and on the basis of the remaining amount of game playing right or the like makes a determination as to whether execution of a game program is enabled or disabled. Hence, if access to the server is interrupted by a communication failure or the like, the game machine fails to execute the game program.

In order to provide elaborate service, the game system requires accurate ascertainment of game machines and amusement arcades (or facilities for amusement) where the game machines are installed. However, if the game machines are transferred to another operator (or to a manager of an amusement arcade) or to still another operator, elaborate service cannot be offered. In this case, institution of measures, such as measures to inhibit the game machines from executing game programs, is effective.

When a configuration of such a game system is changed, settings of a game machine, such as access information, which are required for accessing a predetermined server (i.e., service offered by the server) must be changed, Hence, a change in the system configuration often becomes intricate.

SUMMARY OF THE INVENTION

It is therefore the first object of the invention to provide a network game system, a center server and a game machine used with the game system, and a method and program for controlling the center server and the game machine, which enable a game machine to execute a game program even when a communication failure or the like inhibits access to a server which collectively manages game playing rights.

It is therefore the second object of the invention to provide a network game system, a center server and a game machine used with the game system, and a method and program for controlling the center server and the game machine, which can control a game machine in order to offer elaborate service even when the game machine has been transferred to another operator (proprietor).

It is therefore the third object of the invention to provide a network game system, a center server and a game machine used with the game system, and a method and program for controlling the center server and the game machine, which enable modification of a system configuration without causing a game machine to change settings.

In order to achieve the first object, according to the invention, there is provided a network game system, comprising:
 a center server; and
 a game machine, communicatively connected to the center server and operable to execute a game program, wherein:
 the center server comprises a first transmitter, which transmits, to the game machine, first data indicating a settled play amount out of a played amount which is represented by either an accumulated number or time period that the game program has been executed; and
 the game machine comprises:
 a first storage, operable to store the first data;
 a second storage, operable to store second data indicating the played amount;
 a first receiver, which receives the first data transmitted by the first transmitter;
 an updater, which updates the first data stored in the first storage with the first data received by the first receiver;
 a third storage, operable to store third data indicating an allowable unsettled play amount which represents either an allowable number or time period of which the game program is executed without settlement; and
 a controller, which controls the game machine based on the first data stored in the first storage, the second data stored in the second storage and the third data stored in the third storage.

There is also provided a center server, which is communicatively connected to a game machine operable to execute a game program, the center server comprising a transmitter, which transmits data indicating a settled play amount out of a played amount, which is represented by either an accumulated number or time period that the game program has been executed, to the game machine.

There is also provided a computer-readable medium in which a program is recorded, the program causing a computer to serve as a center server communicatively connected to a game machine operable to execute a game program, the center server comprising a transmitter which transmits data indicating a settled play amount out of a played amount which is represented by either an accumulated number or time period that the game program has been executed, to the game machine.

There is also provided a method of controlling a center server, comprising steps of:
 connecting communicatively the center server to a game machine operable to execute a game program; and
 transmitting, to the game machine, first data indicating a settled play amount out of a played amount which is represented by either an accumulated number or time period that the game program has been executed.

There is also provided a game machine, which is communicatively connected to a center server and operable to execute a game program, the game machine comprising:
 a first storage, operable to store first data indicating a settled play amount out of a played amount which is represented by either an accumulated number or time period that the game program has been executed;
 a second storage, operable to store second data indicating the played amount;
 a receiver, which receives the first data transmitted from the center server;

an updater, which updates the first data stored in the first storage with the first data received by the receiver;

a third storage, operable to store third data indicating an allowable unsettled play amount which represents either an allowable number or time period of which the game program is executed without settlement; and a controller, which controls the game machine based on the first data stored in the first storage, the second data stored in the second storage and the third data stored in the third storage.

There is also provided a computer-readable medium in which a program is recorded, the program causing a computer to serve as a game machine communicatively connected to a center server and operable to execute a game program, the game machine comprising:

a first storage, operable to store first data indicating a settled play amount out of a played amount which is represented by either an accumulated number or time period that the game program has been executed;

a second storage, operable to store second data indicating the played amount;

a receiver, which receives the first data transmitted from the center server;

an updater, which updates the first data stored in the first storage with the first data received by the receiver;

a third storage, operable to store third data indicating an allowable unsettled play amount which represents either an allowable number or time period of which the game program is executed without settlement; and a controller, which controls the game machine based on the first data stored in the first storage, the second data stored in the second storage and the third data stored in the third storage.

There is also provided a method of controlling a game machine operable to execute a game program, comprising steps of:

connecting the game machine to a center server communicatively;

storing, in a first storage, first data indicating a settled play amount out of a played amount which is represented by either an accumulated number or time period that the game program has been executed;

storing, in a second storage, operable to store second data indicating the played amount;

receiving the first data transmitted from the center server;

updating the first data stored in the first storage with the first data received from the center server;

storing, in a third storage, third data indicating an allowable unsettled play amount which represents either an allowable number or time period of which the game program is executed without settlement; and controlling the game machine based on the first data stored in the first storage, the second data stored in the second storage and the third data stored in the third storage.

In the above configurations, the operation control of the game machine is performed on the basis of the played amount, the settled play amount, and the allowable unsettled play amount, all of which are stored in the game machine. As a result, the game machine can execute the game program even when a communication error hinters access to a server which collectively manages game playing rights.

It is preferable that: the game machine comprises a second transmitter, which transmits the second data to the center server; and the center server comprises: a second receiver, which receives the second data transmitted by the second transmitter; and a calculator, which calculates the first data based on a game playing right which has been purchased and the second data received by the second receiver.

It is also preferable that the controller inhibits the execution of the game program according to the third data stored in the third storage and a difference between the first data stored in the first storage and the second data stored in the second storage.

In such a configuration, in a case where a communication failure hinders access to a server which collectively manages game playing rights, the game machine can execute a game program even if a difference arises between the played amount and the settled play amount, so long as the difference is not greater than (or less than) an allowable unsettled play amount Consequently, the game machine can execute a game program even when a communication failure hinders access to a server which collectively manages game playing rights.

In order to achieve the second object, according to the invention, there is provided a network game system, comprising:

a center server; and a game machine, installed in an amusement arcade and communicatively connected to the center server, the game machine being operable to execute a game program, wherein:

the game machine comprises:

a first storage, operable to store first information for identifying the game machine;

a first transmitter, which transmits the first information to the center server;

the center server comprises:

a first receiver, which receives the first information transmitted by the first transmitter;

an acquirer, which acquires second information for identifying the amusement arcade in which the game machine identified by the first information is installed;

an operation determinant, which generates third information indicating how to control the game machine, based on the first information received by the first receiver and the second information acquired by the acquirer; and a second transmitter, which transmits the third information generated by the operation determinant to the game machine; and the game machine further comprises:

a second receiver, which receives the third information transmitted by the second transmitter; and a controller, which control the game machine in accordance with the third information received by the second receiver.

There is also provided a center server, which is communicatively connected to a game machine installed in an amusement arcade and operable to execute a game program, the center server comprising:

a receiver, which receives, from the game machine, the first information for identifying the game machine;

an acquirer, which acquires second information for identifying the amusement arcade in which the game machine identified by the first information is installed;

an operation determinant, which generates third information indicating how to control the game machine, based on the first information received by the receiver and the second information acquired by the acquirer; and a transmitter, which transmits the third information generated by the operation determinant to the game machine.

There is also provided a computer-readable medium in which a program is recorded, the program causing a computer to serve as a center server communicatively connected to a game machine installed in an amusement arcade and operable to execute a game program, the center server comprising:

a receiver, which receives, from the game machine, the first information for identifying the game machine;

an acquirer, which acquires second information for identifying the amusement arcade in which the game machine identified by the first information is installed;

an operation determinant, which generates third information indicating how to control the game machine, based on the first information received by the receiver and the second information acquired by the acquirer; and a transmitter, which transmits the third information generated by the operation determinant to the game machine.

There is also provided a method of controlling a center server, comprising steps of:

connecting communicatively the center server to a game machine installed in an amusement arcade and operable to execute a game program;

receiving, from the game machine, the first information for identifying the game machine;

acquiring second information for identifying the amusement arcade in which the game machine identified by the first information is installed;

an operation determinant, which generates third information indicating how to control the game machine, based on the received first information received and the acquired second information; and transmitting the generated third information to the game machine.

There is also provided a game machine, which is installed in an amusement arcade and communicatively connected to a center server, the game machine being operable to execute a game program, and comprising:

a storage, operable to store first information for identifying the game machine;

a transmitter, which transmits the first information to the center server;

a receiver, which receives third information indicating how to control the game machine which is transmitted from the center server; and a controller, which control the game machine in accordance with the third information received by the receiver.

There is also provided a computer-readable medium in which a program is recorded, the program causing a computer to serve as a game machine installed in an amusement arcade and communicatively connected to a center server, the game machine being operable to execute a game program and comprising:

a storage, operable to store first information for identifying the game machine;

a transmitter, which transmits the first information to the center server;

a receiver, which receives third information indicating how to control the game machine which is transmitted from the center server; and a controller, which control the game machine in accordance with the third information received by the receiver.

There is also provided a method of controlling a game machine installed in an amusement arcade and operable to execute a game program, comprising steps of:

connecting communicatively the game machine to a center server;

storing first information for identifying the game machine;

transmitting the first information to the center server;

receiving third information indicating how to control the game machine which is transmitted from the center server; and controlling the game machine in accordance with the third information received by the receiver.

In such configurations, the operation control of the game machine can be performed on the basis of the game machine identifying information and the amusement arcade identifying information. Therefore, even when the game machine is transferred to another operator (proprietor), control of the game machine can be performed so as to provide elaborate service.

It is preferable that: the center server comprises a second storage, operable to store fourth information indicating a correspondence between the first information and the second information; and the operation determinant generates the third information based on the first information received by the first receiver, the second information acquired by the acquirer, and the fourth information stored in the second storage.

In such a configuration, authenticity of a correspondence between the game machine identifying information received from the game machine and the amusement arcade identifying information acquired from the center server can be judged from contents of the fourth information.

It is preferable that the controller inhibits the execution of the game program, in accordance with the third information.

According to one aspect of the invention, the operation control means inhibitions execution of the game program on the basis of the operation control information.

In order to achieve the third object, according to the invention, there is provided a network game system, comprising:

a center server;

at least one service server;

a game machine, communicatively connected to the center server and the service server, and operable to execute a game program based on information received from the service server, wherein:

the center server comprises a first storage, operable to store a table indicating a correspondence between a service to be used by the game machine and access information indicating how to access the service server offering the service;

the game machine comprises a first transmitter, which transmits a request, which requests the center server to transmit the access information, to the center server;

the center server further comprises:

a first receiver, which receives the request transmitted by the first transmitter;

a reader, which reads out the access information designated by the request received by the first receiver, from the first storage; and a second transmitter, which transmits the access information read out by the reader, to the game machine; and the game machine further comprises:

a second storage, operable to store the access information;

a second receiver, which receives the access information transmitted by the second transmitter;

an updater, which updates the access information stored in the second storage with the access information received by the second receiver; and a controller, which controls the game machine in accordance with the access information stored in the second storage.

There is also provided A center server, which is communicatively connected to a game machine communicatively connected to at least one service server and operable to execute a game program based on information received from the service server, the center server comprising:

a storage, operable to store a table indicating a correspondence between a service to be used by the game machine and access information indicating how to access the service server offering the service;

a receiver, which receives the request, which requests the center server to transmit the access information, transmitted from the center server;

a reader, which reads out the access information designated by the request received by the receiver, from the first storage; and a transmitter, which transmits the access information read out by the reader, to the game machine.

There is also provided a computer-readable medium in which a program is recorded, the program causing a computer to serve as a center server communicatively connected to a game machine communicatively connected to at least one service server and operable to execute a game program based on information received from the service server, the center server comprising:

a storage, operable to store a table indicating a correspondence between a service to be used by the game machine and access information indicating how to access the service server offering the service;

a receiver, which receives a request, which requests the center server to transmit the access information, transmitted from the center server;

a reader, which reads out the access information designated by the request received by the receiver, from the first storage; and a transmitter, which transmits the access information read out by the reader, to the game machine.

There is also provided a method of controlling a center server, comprising steps of:

connecting communicatively the center server to a game machine communicatively connected to at least one service server and operable to execute a game program based on information received from the service server;

storing, in a storage, a table indicating a correspondence between a service to be used by the game machine and access information indicating how to access the service server offering the service;

receiving a request, which requests the center server to transmit the access information, transmitted from the center server;

reading out the access information designated by the request received by the receiver, from the storage; and transmitting the read out access information to the game machine.

There is also provided a game machine, which is communicatively connected to a center server and at least one service server, the game machine being operable to execute a game program based on information received from the service server, the game machine comprising:

a transmitter, which transmits a request, which requests the center server to transmit the access information, to the center server;

a storage, operable to store the access information;

a receiver, which receives the access information transmitted from the center server;

an updater, which updates the access information stored in the storage with the access information received by the receiver; and a controller, which controls the game machine in accordance with the access information stored in the storage.

There is also provided a computer-readable medium in which a program is recorded, the program causing a computer to serve as a game machine communicatively connected to a center server and at least one service server, the game machine being operable to execute a game program based on information received from the service server, the game machine comprising:

a transmitter, which transmits a request, which requests the center server to transmit the access information, to the center server;

a storage, operable to store the access information;

a receiver, which receives the access information transmitted from the center server;

an updater, which updates the access information stored in the storage with the access information received by the receiver; and a controller, which controls the game machine in accordance with the access information stored in the storage.

There is also provided a method of controlling a game machine, comprising steps of:

connecting communicatively the game machine to a center server and at least one service server so as to be operable to execute a game program based on information received from the service server;

storing the access information in a storage;

transmitting a request, which requests the center server to transmit the access information, to the center server;

receiving the access information transmitted from the center server;

updating the access information stored in the storage with the received access information; and a controller, which controls the game machine in accordance with the access information stored in the storage.

In such configurations, the access information about the service server is collectively managed by the center server. The game machine acquires the access information from the center server and makes an access to the service server on the basis of the access information. Therefore, the configuration of the system can be modified without causing the game machine to change settings.

BRIEF DESCRIPTION OF THE DRAWINGS

The above objects and advantages of the present invention will become more apparent by describing in detail preferred exemplary embodiments thereof with reference to the accompanying drawings, wherein:

FIG. 3 is a view showing contents of an arcade information table;

FIG. 4 is a view showing contents of a installation information table;

FIG. 5 is a view showing contents of a remained play information table;

FIG. 6 is a view showing contents of a played amount information table;

FIG. 7 is a view showing contents of a service information table;

FIG. 9 is a view showing contents of a played amount storage, contents of a settled play amount storage, and contents of an unsettled play amount storage;

FIG. 10 is a view showing contents of an access information table;

FIGS. 13A to 13C are tables showing a played amount, a settled play amount, an allowable unsettled play amount, all of which are stored in the game machine, a played amount, a settled play amount, and a remained play amount, all of which are stored in the center server;

DETAILED DESCRIPTION OF THE PREFERRED EMBODIMENTS

A preferred embodiment of the invention will be described in detail hereinbelow by reference to the accompanying drawings.

1. Overall Configuration of Network Game System

Figure 1:
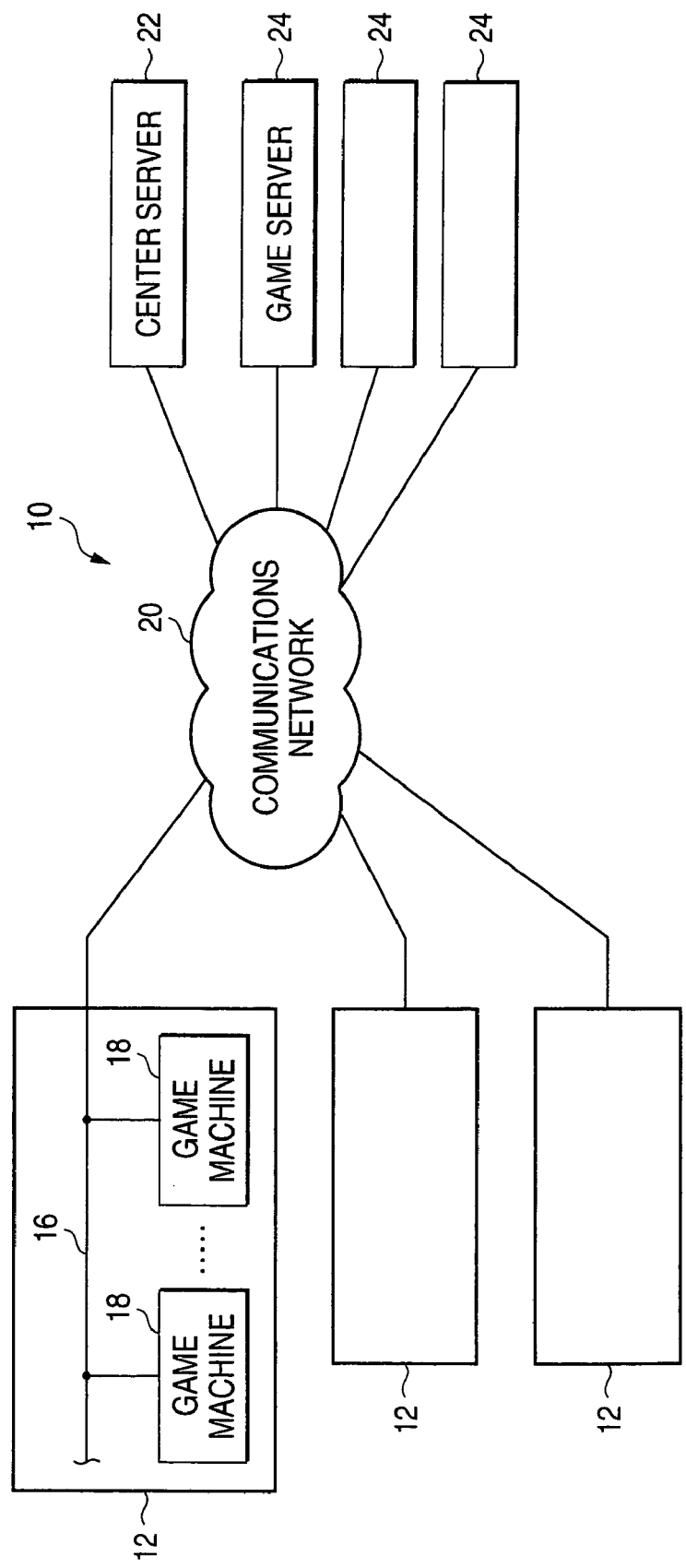
FIG. 1 is a view showing an entire configuration of a network game system according to an embodiment of the invention.

A network game system 10 shown in FIG. 1 manages progress in games executed by a plurality of game machines 18 installed in a plurality of amusement arcades (facilities for amusement) 12, respectively, and provides a network game such as a fighting game utilizing a network. The amusement arcades 12 can exchange data with a center server 22 and a game server 24 by way of a communications network 20 such as the Internet, a public telephone network, or a private line. Different network addresses are assigned to the respective amusement arcades 12. Further, network addresses allocated to the respective amusement arcades 12, where the game machines 18 are to be installed, are also assigned to the respective game machines 18.

The center server 22 is constituted through use of, e.g., a known server computer and is managed by a manufacturer of the game machines 18, a production company that produces game programs to be executed by the game machines 18, or a subcontractor which has received a commission from the manufacturer or the production company. The game server 24 is also constituted through use of, e.g., a known server computer, and is managed by a manufacturer of the game machines 18, a production company that produces game programs to be executed by the game machines 18, or a subcontractor which has received a commission from the manufacturer or the production company.

The amusement arcades 12 are each equipped with a LAN (local area network) 16. The LAN 16 is connected to the game machines 18. Each of the game machines 18 corresponds to a well-known computer game system comprising a central processing unit (CPU), a storage device such as random access memory (RAM) or read only memory (ROM), a display, and an input device such as a joystick or buttons. When a player has inserted a coin into a coin inlet port as a fee for playing a game, a game program is executed unless an inhibition is imposed on execution of the game program by the game machine 18, in such a manner as will be described later, thereby enabling the player to enjoy playing a game. Alternatively, a fee for playing a game may be collected from the player by a pre-paid card reader or another charging means.

In the network game system 10 having the foregoing configuration, hardware and software, both belonging to the game machine 18, are handled separately. An operator (proprietor) must purchase or lease hardware (machines) but does not have to purchase or lease software (game programs). In relation to software, the production company sells, to the operator, the game playing right for allowing the game machine 18 to execute a game program only a specified number of times. Every time the game machine 18 executes a game program, the game machine 18 performs processing for consuming the thus-purchased game playing right by an amount corresponding to the number of times a game program has been executed (hereinafter called "settlement processing"). In accordance with a result of the processing, execution of the game program is inhibited. In this case, even when execution of settlement processing is hindered by a communication failure, the game machine 18 can continuously execute the game program.

In order to provide elaborate service, the network game system 10 can manage the installed status of each game machine 18 (i.e., the amusement arcade 12 where the game machine 18 is installed). More specifically, even when the game machine 18 is transferred to another operator, the game machine 18 can be controlled so as to offer elaborate service. Particularly, in a predetermined case, the game machine 18 can be controlled such that inhibitions are imposed on execution of a game program.

The network game system 10 offers a so-called network (online) game, wherein the game machine 18 executes a game program in accordance with data or a program received from a service server (i.e., the center server 22 or the game server 24). The game machine 18 is designed to execute a game program while accessing the center server 22 and the game server 24 (specifically, the service offered by the servers), as necessary. Access information about the center server 22 and the game server 24 can be managed collectively by the center server 22 so as to eliminate a necessity for causing the game machine 18 to change settings at the time of modification of the system configuration.

2. Configuration of Center Server

Figure 2:
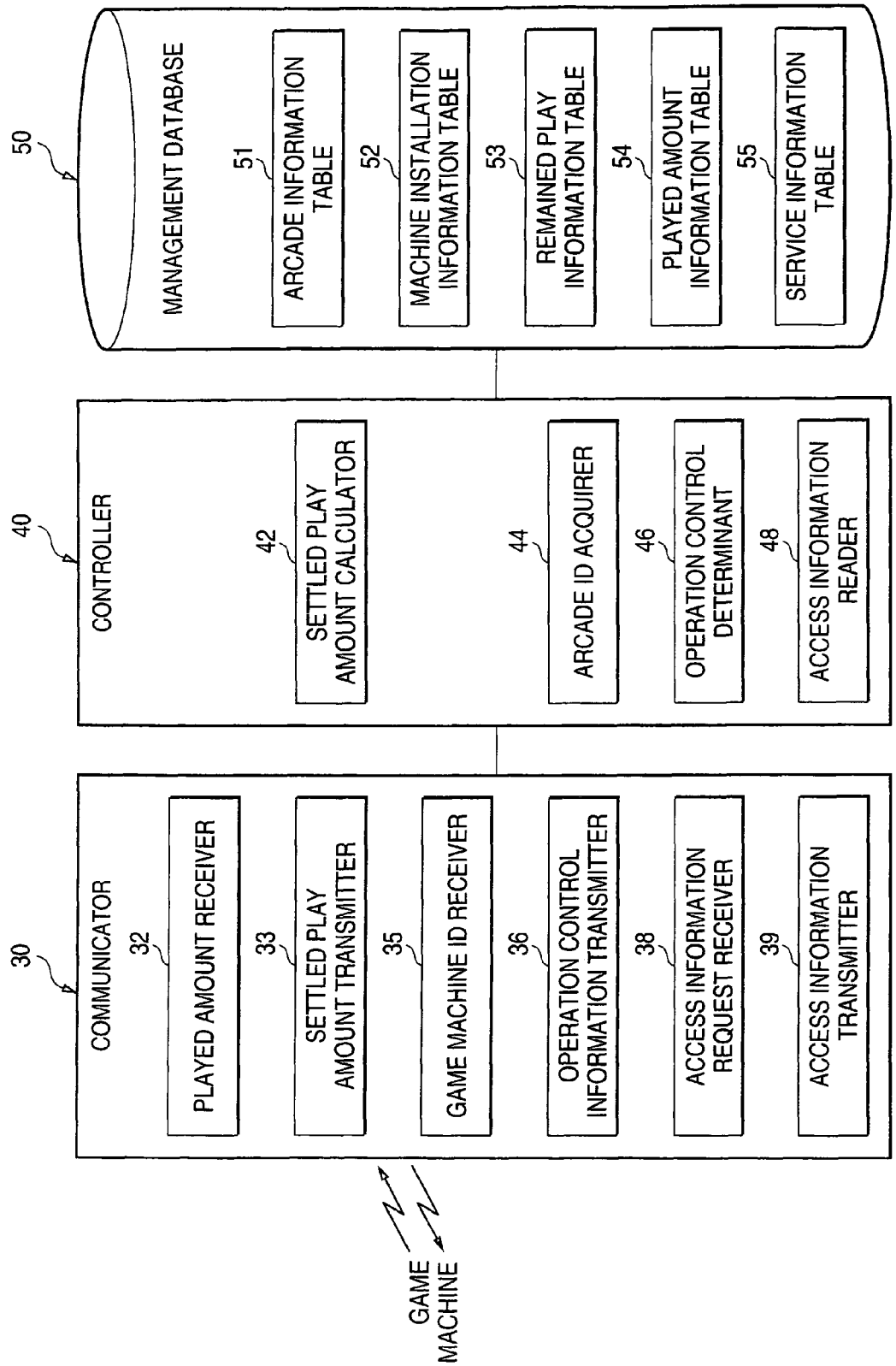
FIG. 2 is a functional block diagram of a center server according to the embodiment of the invention.

FIG. 2 is a view showing a functional block diagram of the center server 22. As illustrated, the center server 22 comprises a communicator 30, a controller 40, and a management database 50. The communicator 30 is constructed so as to include, e.g., a known communication interface, and establishes communication with the game machines 18 by way of the communications network 20. Further, the communicator 30 comprises a played amount receiver 32, a settled play amount transmitter 33, a game machine ID receiver 35, an operation control transmitter 36, an access information request receiver 38, and an access transmitter 39.

The played amount receiver 32 receives a played amount transmitted from the game machine 18. The settled play amount transmitter 33 transmits, to the game machine 18, the settled play amount calculated by a settled play amount calculator 42. The game machine ID receiver 35 receives game machine identifying information transmitted from the game machine 18. The operation control transmitter 36 transmits, to the game machine 18, operation control information representing operation control determined by an operation control determinant 46. The access information request receiver 38 receives an access information request transmitted from the game machine 18. The access transmitter 39 transmits, to the game machine 18, access information read from the management database 50 by an access information reader 48.

The controller 40 comprises a CPU, a memory device such as RAM or ROM, a display, and input devices such as a mouse and a keyboard. The controller 40 updates the management database 50 and controls communication with the game machines 18 installed in the respective amusement arcades 12. The controller 40 includes the settled play amount calculator 42, an arcade ID acquirer 44, the operation control determinant 46, and the access information reader 48. The settled play amount calculator 42 calculates the settled play amount on the basis of the played amount transmitted from the game machine 18 and the purchased game playing right stored in the management database 50.

The arcade ID acquirer 44 acquires amusement arcade identifying information to be used for identifying a facility for amusement (i.e. the amusement arcade 12) where the game machines 18 that transmit game machine identifying information are to be installed. In the embodiment, different network addresses are assigned to the respective amusement arcades 12. Hence, the network addresses are utilized as amusement arcade identifying information. Here, the amusement arcade identifying information items are not limited to the network addresses. The game machine 18 may transmit amusement arcade identifying information, such as an arcade ID, along with the game machine identifying information. The center server 22 may acquire the arcade ID.

The operation control determinant 46 determines operation control to which the game machine 18 is to be subjected, on the basis of the amusement arcade identifying information and the game machine identifying information, which are stored in the management database 50 while being associated with each other. A determination is made as to whether or not a correspondence between the amusement arcade identifying information acquired by the arcade ID acquirer 44 and the game machine identifying information received from the game machine 18 matches the information stored in the management database 50. If no match exits, control operation for the game machine 18 is determined in order to inhibit execution of a game program. The access information reader 48 reads, from a service information table of the management database 50, access information corresponding to the access information request transmitted from the game machine 18.

The management database 50 is constituted of, e.g., a hard disk storage device and stores an arcade information table 51 (see FIG. 3), an installation information table (see FIG. 4), a remained play information table 53 (see FIG. 5), a played amount information table 54 (see FIG. 6), and a service information table 54 (see FIG. 7).

FIG. 3 shows contents of the arcade information table 51 for storing the network addresses assigned to the respective amusement arcades 12. As mentioned above, different network addresses are assigned to the respective amusement arcades 12, and the addresses are stored in the arcade information table 51. Here, the arcade IDs are information items to be used for identifying the respective amusement arcades 12.

FIG. 4 shows contents of the installation information table 52 for storing information regarding the game machines 18 installed in the respective amusement arcades 12 (or the amusement arcades 12 where the game machines 18 are installed). Installed statuses of the respective game machines 18 are collectively managed by the installation information table 52. Here, the game machine IDs are to be used for distinguishing the game machines 18 from each other. The game machine IDs can be assigned to, e.g., housings, game boards, or pieces of software, and can become objects of charging and maintenance. The game machine ID may be generated on the basis of information unique to hardware; for example, contents of an ID chip used in a game board, a media access control (MAC) address assigned to a network interface card (NIC), an EUI (Extended Unique Identifier)-64 address, and a serial ID assigned to a CPU.

FIG. 5 shows contents of the remained play information table 53 for storing the remained play amount that can be executed at each amusement arcade 12. Here, the remained play amount represents the number of times a game program can be executed or a time period during which a game program can be executed, as determined from the purchased game playing right. An operator (proprietor) who runs the amusement arcade 12 purchases a game playing right, thereby increasing the remained play amount. The game playing right may be purchased over the communications network 20 or ordered via a telephone or the like. In the following descriptions, the remained play amount is explained as the number of times a game program can be executed. In the embodiment, the remained play amount is stored for each amusement arcade 12. However, the remained play amount may also be stored on a per-operator-basis or for each game machine 18. In the embodiment, the remained play amount is stored as a game playing right. Alternatively, a balance on an account (e.g., an account for advanced payment) possessed by an individual operator (proprietor) for purchasing game playing rights and a price of the game playing right to enable the game machine 18 to execute each game program one time (i.e., a unit price at which the operator purchases a game playing right) may also be stored as the game playing right.

FIG. 6 shows contents of the played amount information table 54 for storing the record of the games played on each game machine and the settled play amount. Here, the played amount represents an accumulated number of times each game machine 18 executes a game program or an accumulated time period during which each game machine 18 executes a game program. The played amount is updated by a played amount receiver 32 which receives the played amounts transmitted from the respective game machines 18. The settled play amount represents the amount of settled play from among the plays in the played amount of each game machine 18. The settled play amount is calculated and updated by the settled play amount calculator 42 on the basis of the played amount transmitted from the game machine 18 and the purchased game playing right stored in the management database 50. Hereinafter, the played amount is explained as the accumulated number of times each game machine 18 has executed a game program. Moreover, the settled play amount is explained as the number of times play is settled from among the played amount.

FIG. 7 shows contents of the service information table 54 for storing service and corresponding destinations to which access is to be made (e.g., Uniform Resource Locators; URL or the like). As a result, service and a corresponding destination to which access is to be made to the service are managed collectively. Here, service is to be offered by a service server (e.g., the center server 22 or the game server 24). The game machines 18 utilize the service information table 54 for executing a game program, as required. In the embodiment, destinations which are to be accessed are stored on a per-service basis. Alternatively, destinations corresponding to the service may be stored on per-game-program-basis. By such a configuration, a destination corresponding to the same service can be changed in accordance with a game program to be executed.

3. Configuration of Game Machine

Figure 8:
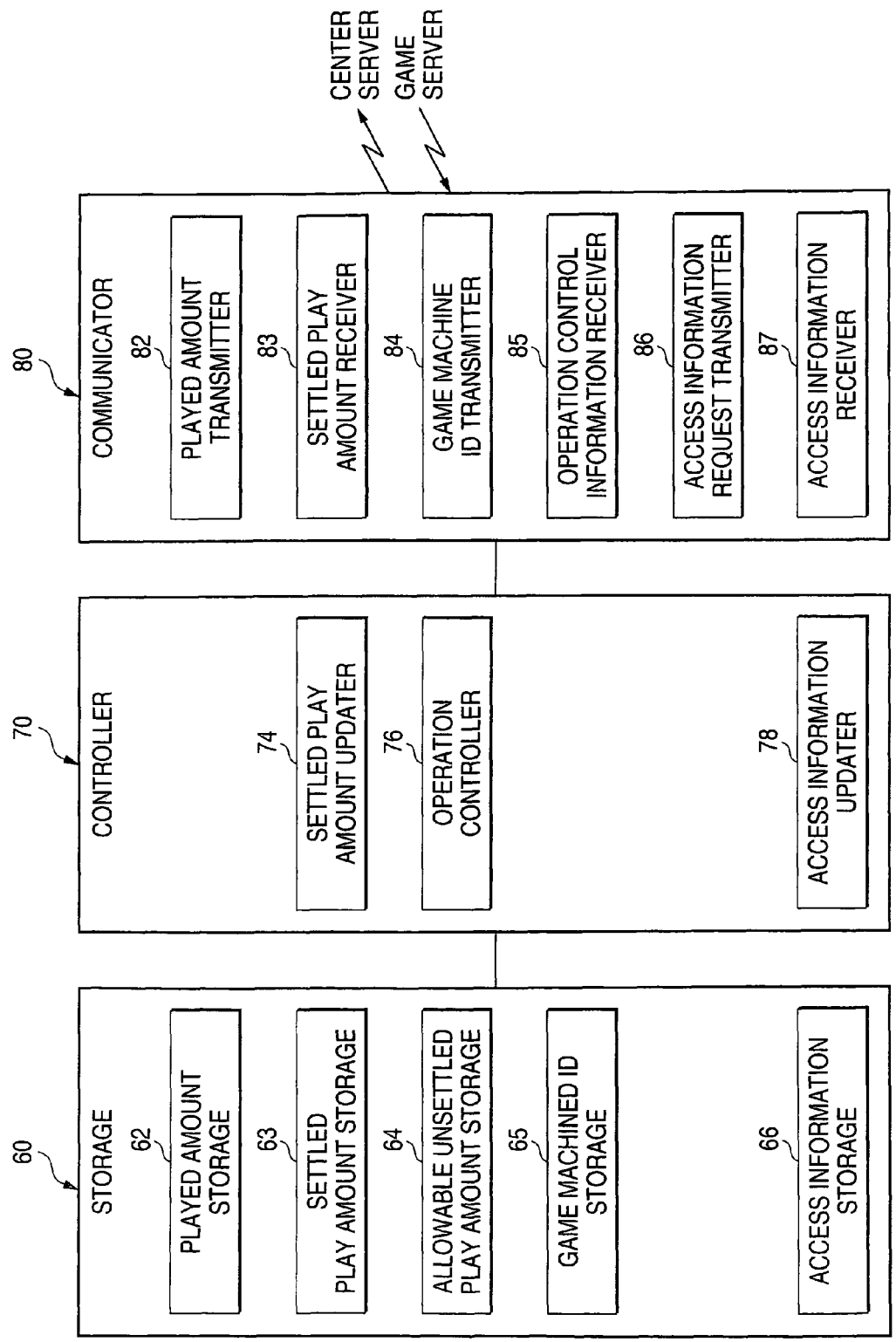
FIG. 8 is a functional block diagram of the game machine of the embodiment.

FIG. 8 shows a functional block diagram of the game machine 18. As illustrated, the game machine 18 includes a storage 60, a controller 70, and a communicator 80. The controller 70 comprises a CPU; a memory device such as RAM or ROM; a display; an operation input device such as a joystick or a button; a coin authenticator for determining whether or not a coin inserted from the coin inlet port is authentic and an amount assigned to the coin; an acoustic device such as a speaker; and a device for loading a game program to the game machine 18 such as a CD-ROM (Compact Disc—Read Only Memory) drive. In addition to having a function of an ordinary game machine 18 (i.e., a game program executing function), the game machine 18 also has the function of inhibiting execution of the game program on the basis of the played amount data stored in a played amount storage 62, the settled play amount data stored in a settled play amount storage 63, and the allowable unsettled play amount data stored in an allowable unsettled play amount storage 64. The controller 70 includes a settled play amount updater 74 for updating the settled play amount, an operation controller 76, and an access information updater 78.

The settled play amount updater 74 updates the amount of settled play stored in the settled play amount storage 63, on the basis of the settled play amount transmitted from the center server 22. The operation controller 76 controls operation of the game machine 18 on the basis of the played amount stored in the played amount storage 62, the settled play amount stored in the settled play amount storage 63, and the allowable unsettled play amount stored in the allowable unsettled play amount storage 64. The operation controller 76 controls operation of the game machine 18 on the basis of the operation control information received from the center server 22. On the basis of the access information stored in an access information storage 66, the operation controller 76 controls operation of the game machine 18. The access information updater 78 updates the access information stored in the access information storage 66 on the basis of the access information transmitted from the center server 22.

The communicator 80 includes a known communication interface and is for establishing data communication with the center server 22 or the game server 24 by way of the LAN 16 and the communications network 20. The communicator 80 comprises a played amount transmitter 82, a settled play amount receiver 83, a game machine ID transmitter 84, an operation control information receiver 85, an access information request transmitter 86, and an access information receiver 87.

The played amount transmitter 82 reads a played amount from the played amount storage 62 and transmits the thus-read played amount to the center server 22. The settled play amount receiver 83 receives the settled play amount transmitted from the center server 22. The game machine ID transmitter 84 reads a game machine ID (game machine identifying information) from a game machine ID storage 65 and transmits the thus-read game machine ID to the center server 22. The operation control information receiver 85 receives the operation control information transmitted from the center server 22. The access information request transmitter 86 transmits an access information request to the center server 22. The access information receiver 87 receives the access information transmitted from the center server 22.

The storage 60 is formed from data storage, e.g., RAM or a hard disk storage device, and comprises the played amount storage 62, the settled play amount storage 63, the allowable unsettled play amount storage 64, the game machine ID storage 65, and the access information storage 66. The played amount storage 62 stores as a played amount the accumulated number of times the game machine 18 has executed a game program. The settled play amount storage 63 stores the settled play amount transmitted from the center server 22. The settled play amount means the number of settled plays from among the played amount of the game machine 18. The allowable unsettled play amount storage 64 stores the allowable unsettled play amount that can be executed by the game machine 18. The allowable unsettled play amount represents the number of times the game machine 18 is allowed to execute a game program without settlement, or a time period during which the game machine 18 is allowed to execute a game program without settlement. Hereinbelow, the allowable unsettled play amount is described as the number of times a game program can be executed without settlement. The game machine ID storage 65 stores the ID information of the game machine 18. The access information storage 66 stores the access information table (see FIG. 10) acquired from the center server 22.

FIG. 9 shows details of the played amount storage 62, those of the settled play amount storage 63, and those of the allowable unsettled play amount storage 64. The played amount is stored in the played amount storage 62 and represents the accumulated number of times the game machine 18 has executed a game program. The played amount is updated by being incremented by the number of times the game machine 18 has executed a game program, after the game machine 18 has executed a game program (i.e., after playing of a game has been completed). The settled play amount is stored in the settled play amount storage 63 and updated by receiving the settled play amount transmitted from the center server 22. The allowable unsettled play amount is stored in the unsettled play amount storage 64. The allowable unsettled play amount may be arranged so that the center server 22 can update the allowable unsettled play amount by way of the communications network 20.

FIG. 10 shows contents of the access information table. The access information table stores service and corresponding destinations which are to be accessed (e.g., URL or the like). Here, service has the same meaning as that mentioned previously (see FIG. 7). Contents of the access information table are updated by receipt of access information transmitted from the center server 22 in response to the access information request output from the game machine 18.

4. Settlement Processing and Inhibition on Execution of Game Program

Here, settlement processing to be performed by the network game system 10 and processing for restricting the game machine 18 to execute a game program will now be described. These processing operations are performed every time the game machine 18 executes a game program (i.e., every time a player plays a game). Specifically, the processing operations are performed after execution of a game program (i.e., after playing of a game is completed).

Figure 11:
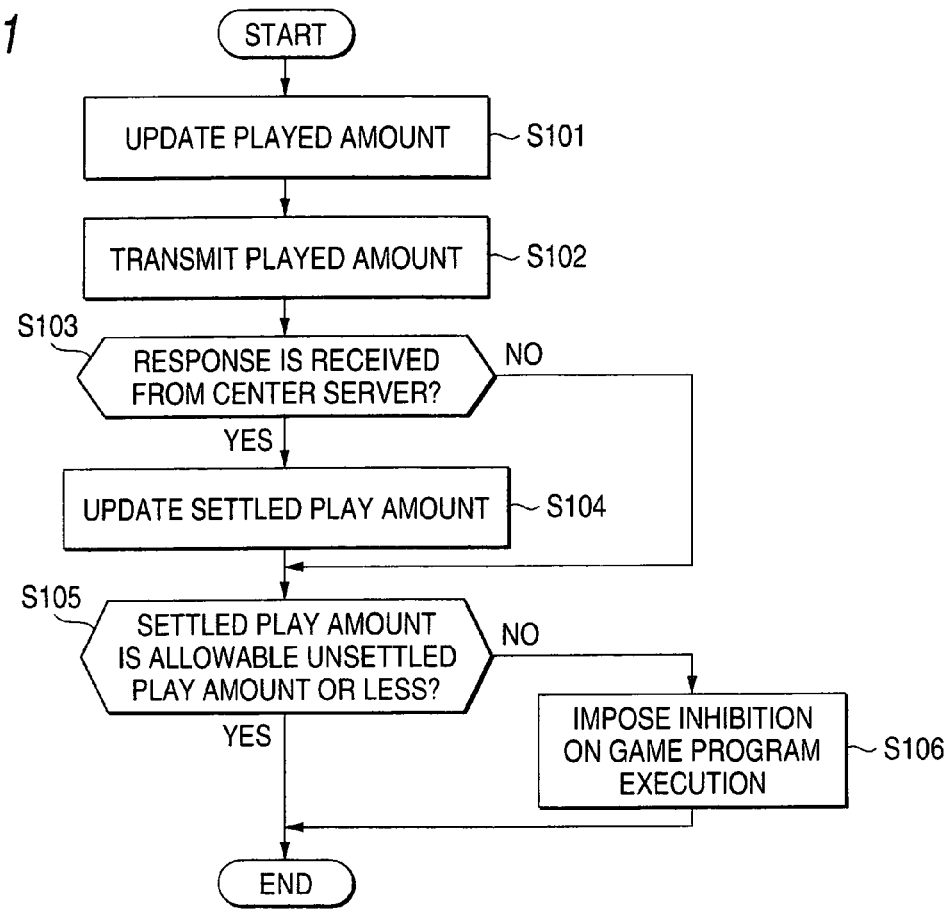
FIG. 11 is a flowchart showing processing to be performed by the game machine after execution of a game program.

FIG. 11 shows processing to be performed by the game machine 18 after execution of a game program. As illustrated, the controller 70 of the game machine 18 reads a played amount from the played amount storage 62. The number of times a game program has been executed (i.e., the number of times a game has been played) is added to the played amount. Here, the number of times a game program has been executed includes the number of players when a plurality of players simultaneously play a game and the number of times a so-called continued game is played when a game is played continuously. For example, when two players simultaneously play a game and they have continued the game one time, a total number of times a program is executed assumes four. The controller 70 of the game machine 18 stores the thus-incremented played amount in the played amount storage 62; namely, the contents of the played amount storage 62 is updated (step S101).

The played amount transmitter 82 of the game machine 18 reads the played amount from the played amount storage 62, reads the game machine ID from the game machine ID storage 65, and transmits the played amount and the game machine ID to the center server 22 (step S102). The center server 22 receives the played amount and calculates the settled play amount. The settled play amount is transmitted to the game machine 18 (see FIG. 12). The settle play amount receiver 83 of the game machine 18 monitors whether or not a response has been received from the center server 22; that is, whether or not the settled play amount has been received (step S103). When the game machine 18 has received the settled play amount within a predetermined time period, the settled play amount updater 72 stores the thus-received settled play amount in the settled play amount storage 63. Specifically, the contents of the settled play amount storage 63 is updated by the received settled play amount (step S104).

When the game machine 18 has not received the settled play amount within a predetermined time period, no response is determined to have been sent from the center server 22. The contents of the settled play amount storage 63 remain unchanged, and processing shifts to processing for determining an inhibition imposed on execution of a game program. In this case, a difference (hereinafter called the "unsettled play amount") arises between the played amount stored in the played amount storage 62 and the settled play amount stored in the settled play amount storage 63.

The operation controller 76 reads the played amount stored in the played amount storage 62 and the settled play amount stored in the settled play amount storage 63, thereby calculating the unsettled play amount. The allowable unsettled play amount stored in the allowable unsettled play amount storage 64 is read, and the thus-read allowable unsettled play amount is compared with the calculated unsettled play amount (step S105). If the unsettled play amount is equal to or less than the allowable amount of unsettled play, processing is terminated without inhibiting execution of a game program. In contrast, when the unsettled play amount exceeds the allowable unsettled play amount, inhibition is imposed so as to hinder execution of a game program (step S106).

In the embodiment, the played amount is transmitted to the center server 22 after execution of a game program. However, the played amount may be transmitted prior to execution of a game program (e.g., when a play has inserted a coin or the like). Alternatively, information to be transmitted is not limited to only the played amount or the game machine ID. For example, information may be transmitted while including the type(s) and number of inserted coins.

Figure 12:
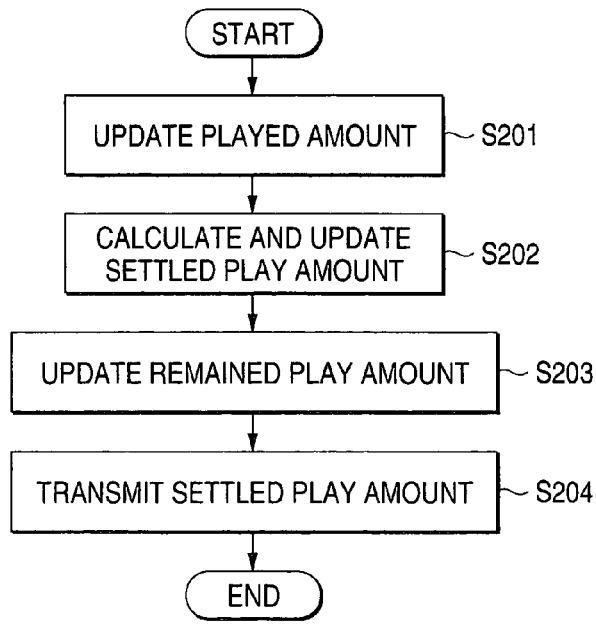
FIG. 12 is a flowchart showing processing to be performed by a center server which has received a played amount.

FIG. 12 shows processing to be performed when the played amount receiver 32 of the center server 22 has received the played amount. As illustrated, after having received the played amount, the played amount receiver 32 reads, from the played amount information table 54, a played amount corresponding to the game machine ID received from the game machine 18, thereby calculating a difference (hereinafter called the "amount of play to be settled") between the played amount received from the game machine 18 and the played amount read from the played amount information table 54. The played amount that has been received from the game machine 18 as a played amount corresponding to the game machine ID is stored in the played amount information table 54. Specifically, the contents of the played amount information table 54 are updated by the game machine ID and the played amount, both being received from the game machine 18 (step S201).

Next, the settled play amount calculator 42 reads, from the installation information table 52, an arcade ID where the game machine 18 assigned the received game machine ID is installed. Further, the remained play amount assigned to the arcade ID is read from the remained play information table 53. The amount of play to be settled is compared with the remained play amount.

When the amount of play to be settled is equal to or less than the remained play amount, the play to be settled can be settled by the remained play amount. Therefore, the settled play amount calculator 42 reads the settled play amount corresponding to the game machine ID from the played amount information table 54, and adds the read amount to the settled play amount, thereby storing in the played amount information table 54 the resultant amount as the settled play amount corresponding to the game machine ID.

When the amount of play to be settled exceeds the remained play amount, the play to be settled cannot be settled partly or entirely. Therefore, the settled play amount calculator 42 reads the settled play amount corresponding to the game machine ID from the played amount information table 54, and adds the actually settled amount to the settled play amount, thereby storing in the played amount information table 54 the resultant amount as the settled play amount corresponding to the game machine ID.

Specifically, the settled play amount corresponding to the game machine ID in the played amount information table 54 is updated (step S202).

The amount of play to be settled is subtracted from the remained play amount, and the result of subtraction is stored as the remained play amount corresponding to the arcade ID provided in the remained play information table 53. Specifically, the remained play amount corresponding to the arcade ID stored in the remained play information table 53 is updated (step S203). Here, when a deficiency arises in the remained play amount, it assumes a negative value. The settled play amount transmitter 33 reads, from the played amount information table 54, the settled play amount corresponding to the game machine ID and sends the thus-read settled play amount to the game machine 18 (step S204). The game machine 18 receives the settled play amount and performs the above described processing (pertaining to steps S104 to S106).

Processing (step S105) for rendering a determination as to whether to restrict the game machine 18 from executing a game program will now be described in more detail. FIGS. 13A to 13C show the contents of the played amount storage 62, those of the settled play amount storage 63, those of the allowable unsettled play amount storage 64, all three of these sections belonging to the game machine 18; the played amount and the settled play amount which pertain to the game machine 18 and are read from the played amount information table 54 of the center server 22; and the remained play amount for the amusement arcade 12 where the game machine 18 is installed.

FIG. 13A shows a state in which the game machine 18 has already executed a game program 100 times. The game machine 18 stores a value of 100 as a played amount and the settled play amount and a value of 10 as the allowable unsettled play amount. The center server 22 stores a value of 100 as a played amount and the settled play amount and: a value of 15 as the remained play amount. In other words, FIG. 13A shows that the 100 games for which the game machine 18 has already executed the game program have already been settled and that the game playing right to enable the game machine 18 to execute the game program 15 more times is registered in the center server 22.

Provided that, in the state shown in FIG. 13A, the game machine 18 executes the game program one time and that the center server 22 performs settlement processing, the state shifts to a state shown in FIG. 13B, The played amount and the settled play amount of the game machine 18 and those of the center server 22 are updated from 100 to 101. Further, the remained play amount of the center server 22 is updated from 15 to 14.

FIG. 13C shows a case where a communication failure hinders communications of data between the game machine 18 and the center server 22 in spite of the game machine 18 having executed the game program one time in the state shown in FIG. 13B. An unsettled play amount has arisen in the game machine 18. However, the unsettled play amount (1) is lower than the allowable unsettled play amount (10). Hence, no inhibition is imposed on execution of the game program. In the illustrated embodiment, if the unsettled play amount stemming from a communication failure or the like is equal to or less than 10, no inhibition is imposed on execution of a game program. If transmission and receipt of data with the center server 22 can be carried out and settlement processing is completed after execution of the game program for the next round, the unsettled play amount will be eliminated. In the embodiment, the played amount and the settled play amount are exchanged between the game machine 18 and the center server 22 not in the form of increments or decrements but in the form of absolute values. Therefore, even if a communication failure has arisen, a glitch, such as a data mismatch, is unlikely to arise.

In view of the above, the operation of the game machine 18 is controlled on the basis of the played amount stored in the played amount storage 62, the settled play amount stored in the settled play amount storage 63, and the allowable unsettled play amount stored in the allowable unsettled play amount storage 64. As a result, even if a communication failure or the like hinders access to the center server 22; that is, even if no response is returned from the center server 22 (i.e., the settled play amount is not received), the game machine 18 can execute a game program by determining whether or not to impose an inhibition on execution of the game program, on the basis of the played amount, the settled play amount, and the allowable unsettled play amount, all of which are stored in the game machine 18.

5. Operation Control of Game Machine Based on Installed State

There will now be described processing for controlling the operation of the game machine 18 according to the installed state thereof; particularly, control operation for restricting the game machine 18 to execute a game program in a predetermined situation.

Figure 14:
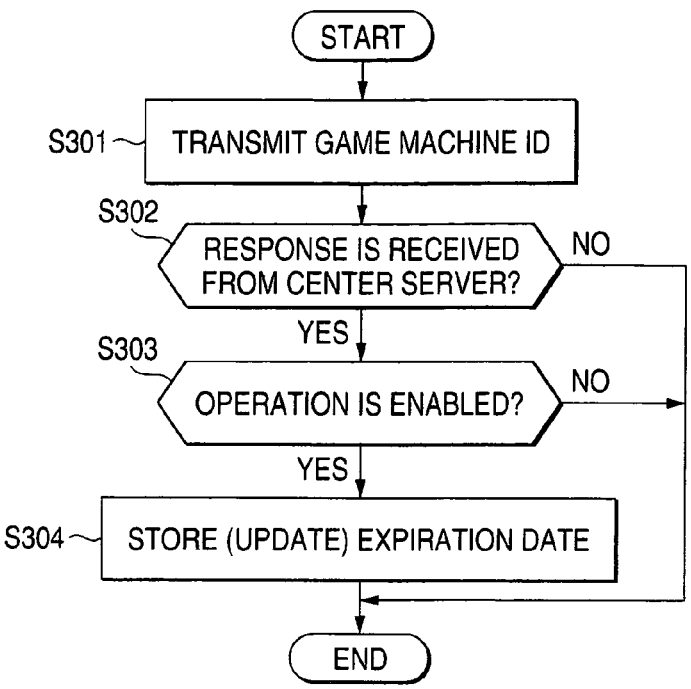
FIG. 14 is a flowchart showing processing to be performed by the game machine.

FIG. 14 shows processing to be performed by the game machine 18. As illustrated, the game machine ID transmitter 84 of the game machine 18 reads a game machine ID from the game machine ID storage 65 and transmits the thus-read game machine ID to the center server 22 (step S301). On the basis of the game machine ID, the center server 22 determines control operation for the game machine 18, and operation control information pertaining to operation control is transmitted to the game machine 18 (see FIG. 15). Here, the operation control information includes enable/disable information indicating whether operation of the game machine 18 is enabled or disabled, and expiration date information indicating an expiration date until which the game machine 18 is enabled.

The operation control information receiver 85 of the game machine 18 monitors whether or not a response is received from the center server 22; that is, whether or not operation control information is received (step S302). If the operation control information is not received within a predetermined time period, the processing is terminated. In contrast, if the operation control information is received within the predetermined time period, the enable/disable information included in the operation control information is ascertained (step S303). If the enable/disable information shows disable, the processing is terminated. In contrast, if the enable/disable information shows enable, the expiration date information to be stored in the storage 60 is updated by an expiration date included in the operation control information (step S304). When the expiration date indicated by the expiration date information stored in the storage 60 has lapsed, the game machine 18 is restricted from executing a game program.

Here, it is preferable to cause the game machine to carry out the processing on the basis of the expiration date information. For instance, it is preferable to cause the game machine to carry out processing at a point in time after elapse of half the period which is to elapse before the expiration date. Further, after elapse of the half the period which is to elapse before the expiration date, it is preferable to cause the game machine to carry out processing at predetermined time intervals. Further, it is preferable to shorten the predetermined time period as the expiration date approaches. As a result, the processing is performed normally until the expiration date approaches (i.e., up to step S304). An inhibition is imposed on execution of a game program unless the expiration date information is updated. It is also preferable to carry out the processing even at the activation of the game machine 18. In the embodiment, if the expiration date has passed, execution of a game program is restricted. However, operation of the game machine 18 may be stopped. Alternatively, other operation control may be performed.

Figure 15:
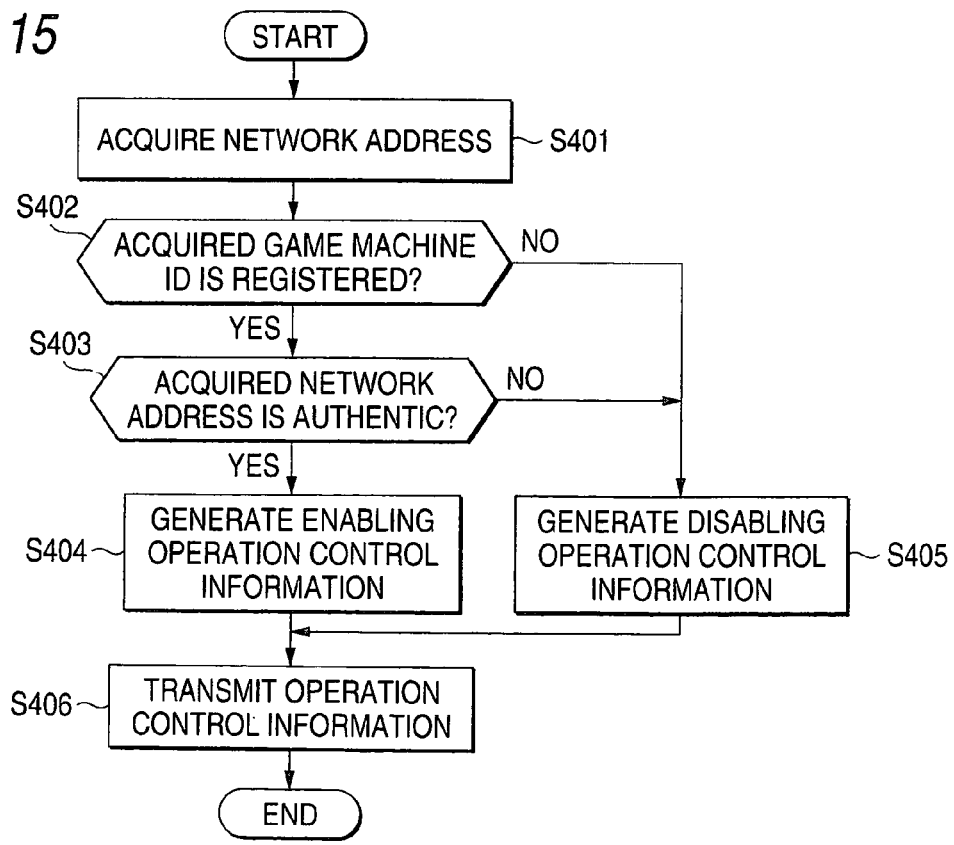
FIG. 15 is a flowchart showing processing to be performed by the center server when a game machine ID is received.

FIG. 15 shows processing to be performed when the game machine ID receiver 35 of the center server 22 receives a game machine ID. As illustrated, the arcade ID acquirer 44 acquires information to be used for identifying the amusement arcade 12 where the game machine 18 that has transmitted the game machine ID is installed. More specifically, the arcade ID acquirer 44 acquires a network address added to a packet used in communicating the game machine ID (step S401). In the embodiment, different network addresses are assigned to the respective amusement arcades 12. Hence, the network addresses can be taken as amusement arcade ID information to be used for identifying the respective amusement arcades 12.

Next, the operation control determinant 44 ascertains whether or not the game machine ID is registered in the installation information table 52 (step S402). If the game machine ID is not registered, operation control information including enable/disable information indicating disable is generated (step S405). In contrast, if the game machine ID is registered, an arcade ID corresponding to the game machine ID is read from the installation information table 52. Further, a network address corresponding to the arcade ID is read from the arcade information table 51.

The network address acquired in S401 is compared with the network address acquired from the arcade information table 51 (step S403). When a match exists between the network addresses, the network address acquired in S401 is determined to be authentic, and operation control information including enable/disable information indicating enable and expiration date information is generated (step 8404). In contrast, when no match exists between the network addresses, operation control information including disable information indicating disable is generated (step S405). The operation control transmitter 36 transmits to the game machine 18 the operation control information generated in S404 or S405. The game machine 18 receives the operation control information and executes the above-described processing (steps S303, S304).

In view of the above, operation control of the game machine 18 can be performed on the basis of the game machine identifying information (a game machine ID) and amusement arcade identifying information (a network address). Therefore, the installed state of the game machine 18 can be managed. Even when the game machine is transferred to another operator (proprietor), operation control of the game machine 18 can be performed so as to offer elaborate service.

6. Collective Management of Access Information

A processing operation to be performed by the game machine 18 and a processing operation to be performed by the center server 22, both processing operations pertaining to collective management of information about access to service, will now be described.

Figure 16:
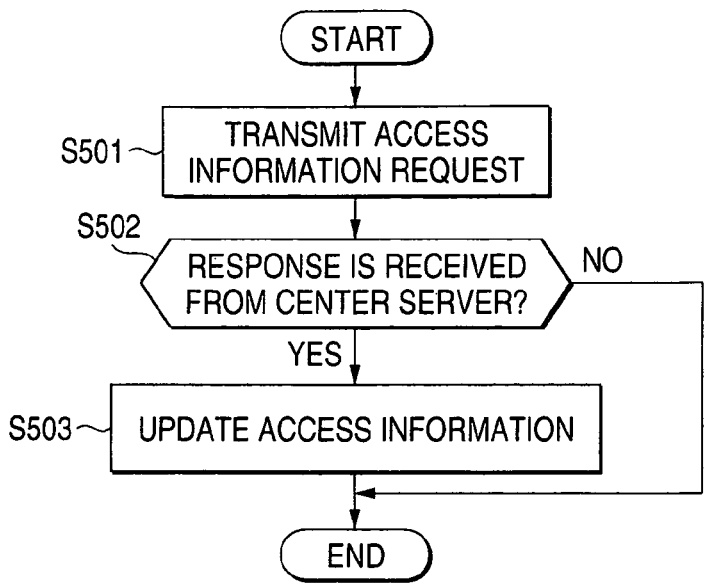
FIG. 16 is a view showing access information acquisition processing to be performed by the game machine.

FIG. 16 shows processing required for the game machine 18 to acquire access information. As illustrated, the access information request transmitter 86 of the game machine 18 transmits an access information request to the center server 22 (step S501). The center server 22 receives the access information request and transmits to the game machine 18 access information corresponding to the access information request (see FIG. 17). The access information receiver 87 of the game machine 18 monitors whether or not a response has been received from the center server 22; that is, whether or not access information has been received (step S502). If the access information has not been received within a predetermined time period, the processing is terminated. In contrast, if the access information has been received within a predetermined time period, the access information updater 78 updates the contents of the access information storage 66 with the received access information (step S503). Here, the only requirement is to perform the processing at the time of activation of the game machine 18. Alternatively, after activation of the game machine 18, the processing may be carried out every predetermined time interval.

Figure 17:
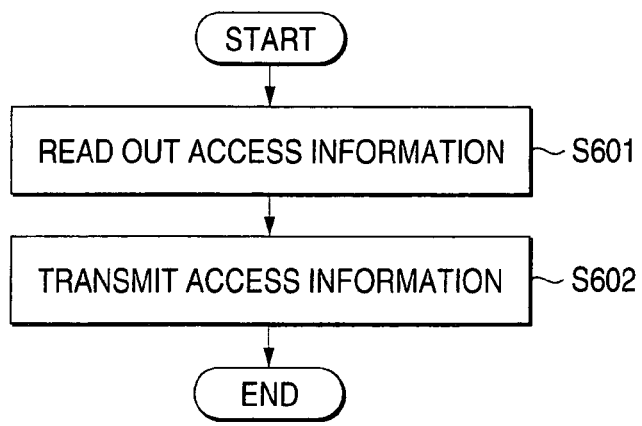
FIG. 17 is a flowchart showing processing to be performed by the center server in response to an access information request.

FIG. 17 shows processing to be performed by the center server 22 when the access information request receiver 38 of the center server 22 has received an access information request. As illustrated, the access information reader 48 of the center server 22 reads access information from the service information table 54 of the management database 50 in accordance with the received access information request (step S601). The access information transmitter 39 transmits the access information to the game machine 18 (step S602). The game machine 18 receives the access information and executes the above-described processing (step S503).

Figure 18:
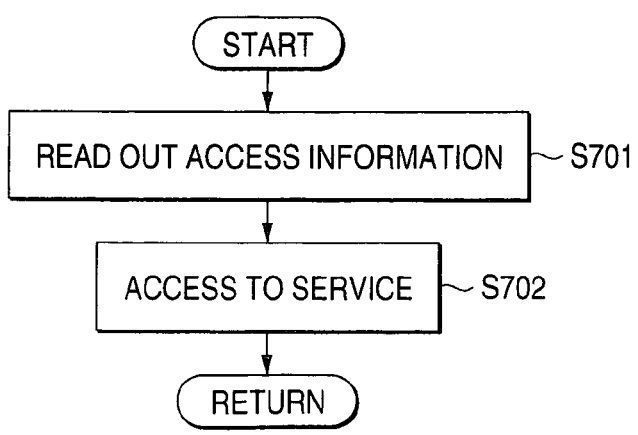
FIG. 18 is a flowchart showing processing to be performed by the game machine at the time of utilization of service.

Processing to be performed by the game machine 18 at time of utilization of service is shown in FIG. 18. As illustrated, the controller 70 of the game machine 18 reads access information to be utilized from the access information stored in the access information storage 6 (step S701). The communicator 80 of the game machine 18 accesses service on the basis of the thus-read access information (step S702). When the game machine 18 sends the played amount or the game machine ID to the center server 22, in step S102 or S301 it is preferable for the game machine 18 to access the center server 22 in accordance with the processing.

In view of the above, the information about access to service is collectively managed by the center server 22. Contents of the access information storage 66 of the game machine 18 are updated by the access information received from the center server 22 at a predetermined timing. On the basis of the contents of the access information storage 66, the game machine 18 accesses service. Even if a change has arisen in the information about access to service as a result of modification of a system configuration, the only requirement is to change the access information collectively managed by the center server 22, thereby obviating a necessity for causing the game machine 18 to change settings.

The invention is not limited to the embodiment. For instance, the center server 22 may be divided into a plurality of servers. For instance, the center server 22 may be divided into a server for performing settlement processing, a server for managing the installed state of the game machine 18, and a server for managing information about access to service.

What is claimed is:

1. A network game system, comprising:

a center server; and a game machine, installed in an amusement arcade and communicatively connected to the center server, the game machine being operable to execute a game program;

wherein the game machine comprises:

a first storage, operable to store first information that identifies the game machine; and a first transmitter, which transmits a packet to the center server, the packet including the first information and a network address uniquely assigned to the amusement arcade;

wherein the center server comprises:

a first receiver, which receives the packet transmitted by the first transmitter;

an acquirer, which acquires second information that identifies the amusement arcade in which the game machine identified by the first information is installed;

an operation determinant, which determines whether the amusement arcade to which the network address is assigned matches with the amusement arcade identified by the second information, and generates third information in a case where it is determined that the amusement arcade to which the network address is assigned does not match with the amusement arcade identified by the second information; and a second transmitter, which transmits the third information generated by the operation determinant to the game machine;

wherein the game machine further comprises:

a second receiver, which receives the third information transmitted by the second transmitter; and a controller, which inhibits the execution of the game program, in a case where the second receiver receives the third information, and wherein in a case where the second receiver does not receive the third information, the controller enables the execution of the game program.

2. The network system as set forth in claim 1, wherein:

the center server comprises a second storage, operable to store fourth information indicating a correspondence between the first information and the second information; and the operation determinant generates the third information based on the first information received by the first receiver, the second information acquired by the acquirer, and the fourth information stored in the second storage.

3. A center server, which is communicatively connected to a game machine installed in an amusement arcade and operable to execute a game program, the center server comprising:

a receiver, which receives, from the game machine, a packet including the first information that identifies the game machine and a network address uniquely assigned to the amusement arcade;

an acquirer, which acquires second information that identifies the amusement arcade in which the game machine identified by the first information is installed;

an operation determinant, which determines whether the amusement arcade to which the network address is assigned matches with the amusement arcade identified by the second information, and generates third information in a case where is it determined that the amusement arcade to which the network address is assigned does not match with the amusement arcade identified by the second information; and a transmitter, which transmits the third information generated by the operation determinant to the game machine, wherein the third information is configured to cause a controller of the game machine to inhibit the execution of the game program, and wherein if the third information is not transmitted by the transmitter, the controller enables the execution of the game program.

4. A computer-readable medium in which a program is recorded, the program configured to cause a computer to serve as a center server communicatively connected directly to a game machine installed in an amusement arcade and operable to execute a game program, the center server comprising:

a receiver, which receives, from the game machine, a packet including the first information that identifies the game machine and a network address uniquely assigned to the amusement arcade;

an acquirer, which acquires second information that identifies the amusement arcade in which the game machine identified by the first information is installed;

an operation determinant, which determines whether the amusement arcade to which the network address is assigned matches with the amusement arcade identified by the second information, and generates third information in a case where it is determined that the amusement arcade to which the network address is assigned does not match with the amusement arcade identified by the second information; and a transmitter, which transmits the third information generated by the operation determinant to the game machine, wherein the third information is configured to cause a controller of the game machine to inhibit the execution of the game program, and wherein if the third information is not transmitted by the transmitter, the controller enables the execution of the game program.

5. A method of controlling a center server, comprising:

connecting communicatively the center server to a game machine installed in an amusement arcade and operable to execute a game program;

receiving, from the game machine, a packet including the first information that identifies the game machine and a network address uniquely assigned to the amusement arcade;

acquiring second information that identifies the amusement arcade in which the game machine identified by the first information is installed;

determining whether the amusement arcade to which the network address is assigned matches with the amusement arcade identified by the second information;

generating third information in a case where it is determined that the amusement arcade to which the network address is assigned does not match with the amusement arcade identified by the second information;

transmitting the generated third information to the game machine;

inhibiting the execution of the game program, in case where the game machine receives the third information; and enabling the execution of the game program in a case where the game machine does not receive the third information.

* * * * *